US011606761B2

(12) United States Patent
Ryu et al.

(10) Patent No.: US 11,606,761 B2
(45) Date of Patent: Mar. 14, 2023

(54) FEEDBACK-BASED TRANSMISSION PROPERTY ADJUSTMENT IN SIDELINK COMMUNICATIONS

(71) Applicant: QUALCOMM Incorporated, San Diego, CA (US)

(72) Inventors: Jung Ho Ryu, Fort Lee, NJ (US); Kapil Gulati, Hillsborough, NJ (US); Junyi Li, Chester, NJ (US); Tianyang Bai, Bridgewater, NJ (US); Vasanthan Raghavan, West Windsor Township, NJ (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/906,210

(22) Filed: Jun. 19, 2020

(65) Prior Publication Data

US 2021/0029654 A1    Jan. 28, 2021

Related U.S. Application Data

(60) Provisional application No. 62/877,187, filed on Jul. 22, 2019.

(51) Int. Cl.
*H04W 52/36* (2009.01)
*H04W 52/26* (2009.01)
(Continued)

(52) U.S. Cl.
CPC ......... *H04W 52/367* (2013.01); *H04L 1/0003* (2013.01); *H04L 1/0026* (2013.01);
(Continued)

(58) Field of Classification Search
CPC ............ H04W 52/367; H04W 52/265; H04W 52/365; H04W 92/18; H04W 76/27;
(Continued)

(56) References Cited

U.S. PATENT DOCUMENTS 9,838,978 B1 * 12/2017 Sung .................... H04W 52/262
2005/0068884 A1 * 3/2005 Yoon ....................... H04L 5/006
370/203
(Continued)

FOREIGN PATENT DOCUMENTS

EP    3402255 A1    11/2018
EP    3402255 B1 *  3/2021    .............. H04W 4/46

OTHER PUBLICATIONS

International Search Report and Written Opinion—PCT/US2020/038933—ISA/EPO—dated Sep. 23, 2020.

*Primary Examiner* — Hardikkumar D Patel
(74) *Attorney, Agent, or Firm* — Harrity & Harrity LLP/Qualcomm Incorporated

(57) ABSTRACT

Various aspects of the present disclosure generally relate to wireless communication. In some aspects, a transmission-adjusting wireless node may transmit a first communication via a sidelink channel. The transmission-adjusting wireless node may receive, from a feedback-reporting wireless node, transmission-specific information relating to at least one of a channel quality of the sidelink channel or a power level for the transmission-adjusting wireless node. The transmission-specific information may be based at least in part on the first communication. The transmission-adjusting wireless node may adjust, based at least in part on the transmission-specific information, a transmission property of the transmission-adjusting wireless node to obtain an adjusted transmission property. The transmission-adjusting wireless node may transmit a second communication via the sidelink channel (Continued)

using the adjusted transmission property. Numerous other aspects are provided.

30 Claims, 5 Drawing Sheets

(51) Int. Cl.
    *H04L 5/00*     (2006.01)
    *H04L 1/00*     (2006.01)
    *H04W 92/18*     (2009.01)

(52) U.S. Cl.
    CPC ......... *H04L 5/0055* (2013.01); *H04W 52/265* (2013.01); *H04W 52/365* (2013.01); *H04W 92/18* (2013.01)

(58) Field of Classification Search
    CPC ............. H04W 52/383; H04W 52/241; H04W 52/243; H04L 1/0003; H04L 1/0026; H04L 5/0055; H04L 5/001; H04L 5/0051; H04L 5/0092; H04L 25/03343; H04L 5/0026; H04L 5/0032; H04L 5/0053; H04L 5/006

See application file for complete search history.

(56) References Cited

U.S. PATENT DOCUMENTS

| | | | |
|---|---|---|---|
| 2013/0244715 A1* | 9/2013 | Kwon | H04W 52/243 |
| | | | 455/522 |
| 2014/0064203 A1* | 3/2014 | Seo | H04W 28/06 |
| | | | 370/329 |
| 2017/0134080 A1* | 5/2017 | Rahman | H04B 7/0456 |
| 2018/0115958 A1* | 4/2018 | Raghavan | H04B 7/0697 |
| 2020/0163005 A1* | 5/2020 | Rao | H04W 8/24 |

* cited by examiner

FEEDBACK-BASED TRANSMISSION PROPERTY ADJUSTMENT IN SIDELINK COMMUNICATIONS

CROSS-REFERENCE TO RELATED APPLICATION

This Patent Application claims priority to U.S. Provisional Patent Application No. 62/877,187, filed on Jul. 22, 2019, entitled "FEEDBACK-BASED TRANSMISSION PROPERTY ADJUSTMENT IN SIDELINK COMMUNICATIONS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for transmission property adjustment in sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a transmission-adjusting wireless node, may include transmitting a first communication via a sidelink channel; receiving, from a feedback-reporting wireless node, transmission-specific information relating to at least one of a channel quality of the sidelink channel or a power level for the transmission-adjusting wireless node, wherein the transmission-specific information is based at least in part on the first communication; adjusting, based at least in part on the transmission-specific information, a transmission property of the transmission-adjusting wireless node to obtain an adjusted transmission property; and transmitting a second communication via the sidelink channel using the adjusted transmission property.

In some aspects, a transmission-adjusting wireless node for wireless communication may include memory and one or more processors coupled to the memory. The memory and the one or more processors may be configured to transmit a first communication via a sidelink channel; receive, from a feedback-reporting wireless node, transmission-specific information relating to at least one of a channel quality of the sidelink channel or a power level for the transmission-adjusting wireless node, wherein the transmission-specific information is based at least in part on the first communication; adjust, based at least in part on the transmission-specific information, a transmission property of the transmission-adjusting wireless node to obtain an adjusted transmission property; and transmit a second communication via the sidelink channel using the adjusted transmission property.

In some aspects, a non-transitory computer-readable medium may store one or more instructions for wireless communication. The one or more instructions, when executed by one or more processors of a transmission-adjusting wireless node, may cause the one or more processors to transmit a first communication via a sidelink channel; receive, from a feedback-reporting wireless node, transmission-specific information relating to at least one of a channel quality of the sidelink channel or a power level for the transmission-adjusting wireless node, wherein the transmission-specific information is based at least in part on the first communication; adjust, based at least in part on the transmission-specific information, a transmission property of the transmission-adjusting wireless node to obtain an adjusted transmission property; and transmit a second communication via the sidelink channel using the adjusted transmission property.

In some aspects, an apparatus for wireless communication may include means for transmitting a first communication via a sidelink channel; means for receiving, from a wireless node, transmission-specific information relating to at least one of a channel quality of the sidelink channel or a power level for the apparatus, wherein the transmission-specific information is based at least in part on the first communication; means for adjusting, based at least in part on the transmission-specific information, a transmission property of the apparatus to obtain an adjusted transmission property; and means for transmitting a second communication via the sidelink channel using the adjusted transmission property.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
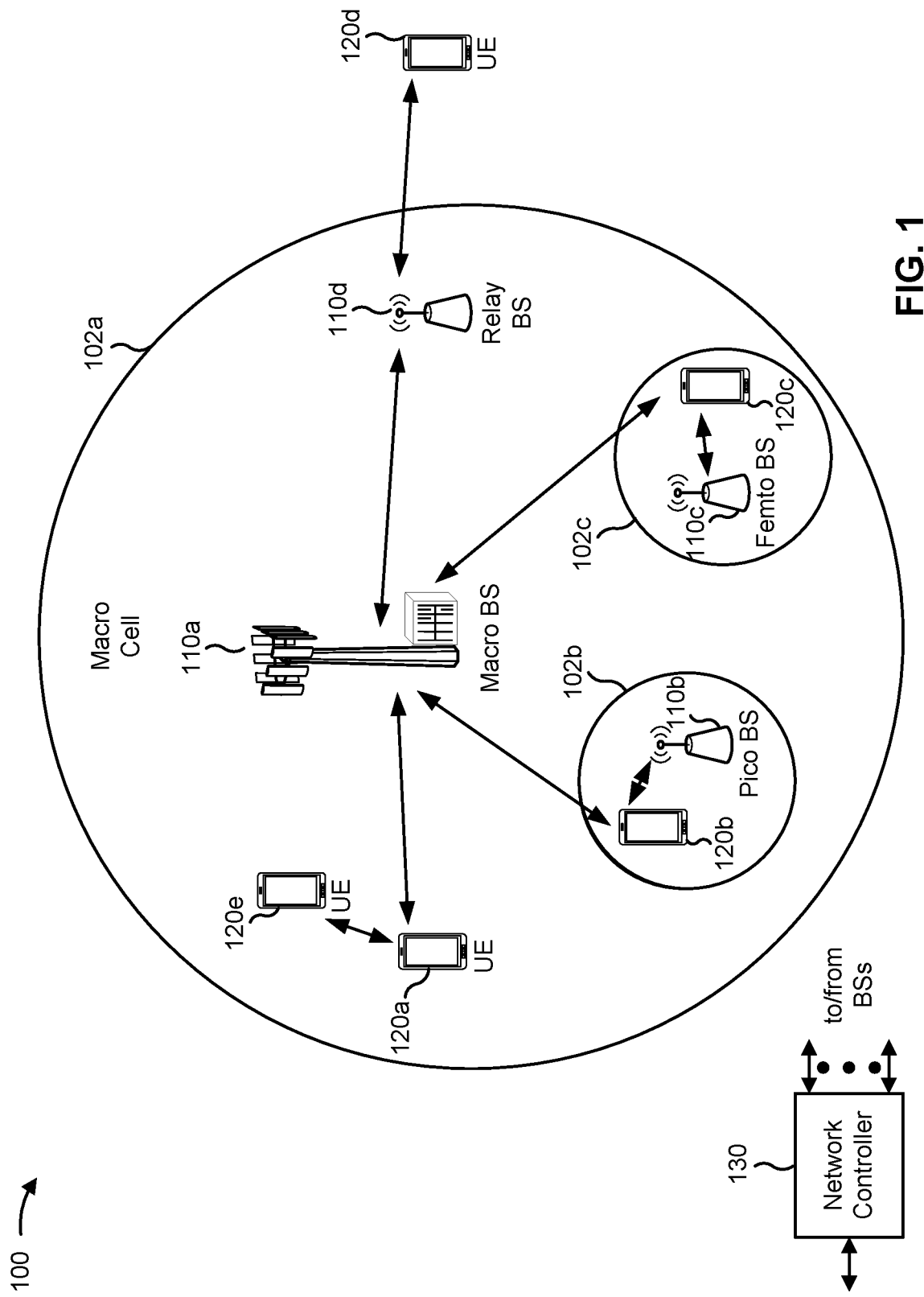
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
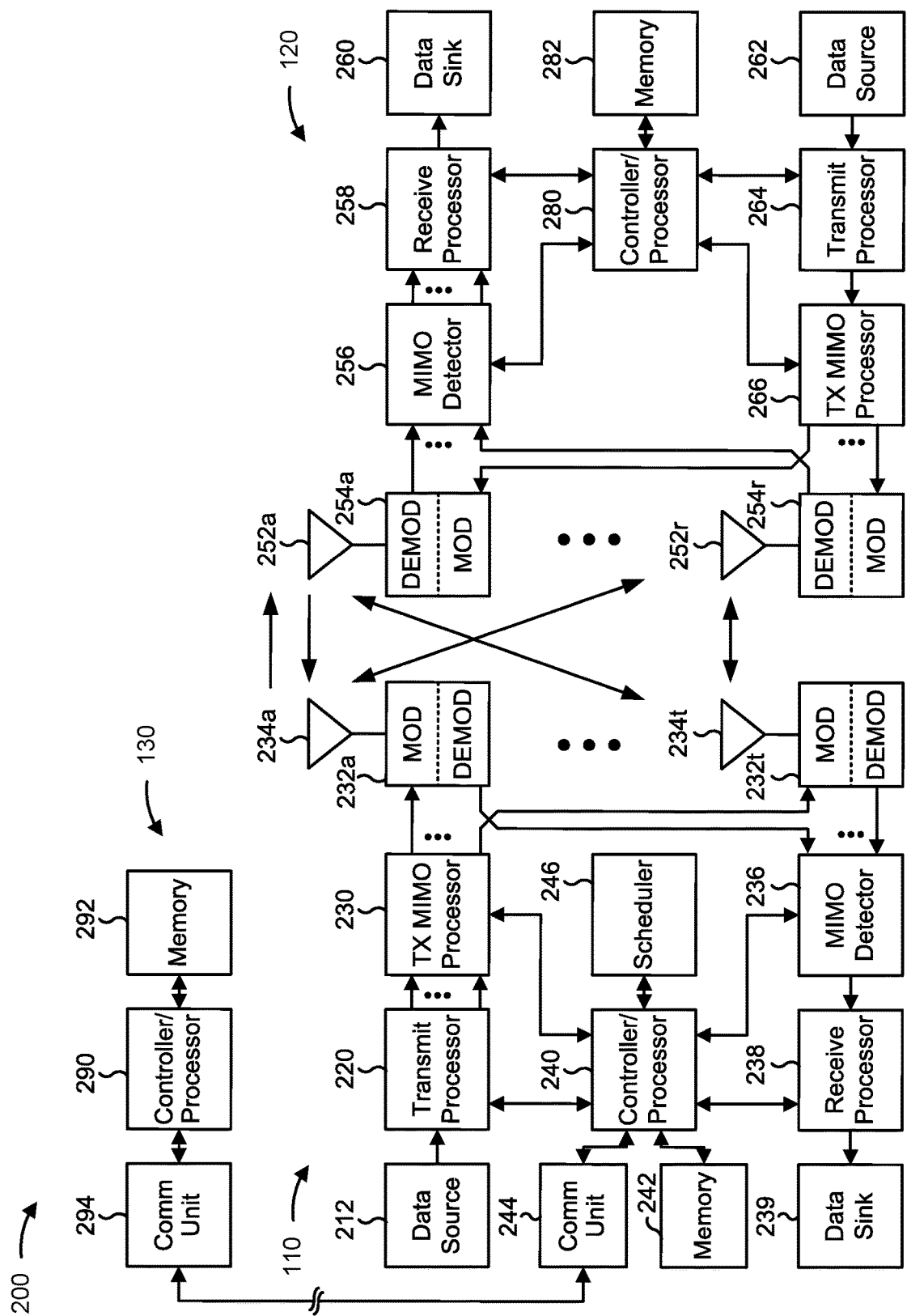
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmission property adjustment in sidelink communications, as described in more detail elsewhere herein. For example, controller/processor 240 of base station 110, controller/processor 280 of UE 120, and/or any other component(s) of FIG. 2 may perform or direct operations of, for example, process 400 of FIG. 4, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may cause the one or more processors to perform the method described in greater detail with reference to FIGS. 4 and 5. A scheduler 246 may schedule UEs for data transmission on the downlink and/or uplink.

In some aspects, UE 120 may include means for transmitting a communication via a sidelink channel (e.g., using controller/processor 280, transmit processor 264, TX MIMO processor 266, MOD 254, antenna 252, and/or the like), means for receiving transmission-specific information relating to at least one of a channel quality of the sidelink channel or a power level (e.g., using antenna 252, DEMOD 254, MIMO detector 256, receive processor 258, controller/processor 280, memory 282, and/or the like), means for adjusting, based at least in part on the transmission-specific information, a transmission property of the apparatus to obtain an adjusted transmission property (e.g., using receive processor 258, controller/processor 280, memory 282, and/or the like), means for transmitting a communication via the sidelink channel using the adjusted transmission property (e.g., using controller/processor 280, transmit processor 264, TX MIMO processor 266, MOD 254, antenna 252, and/or the like), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
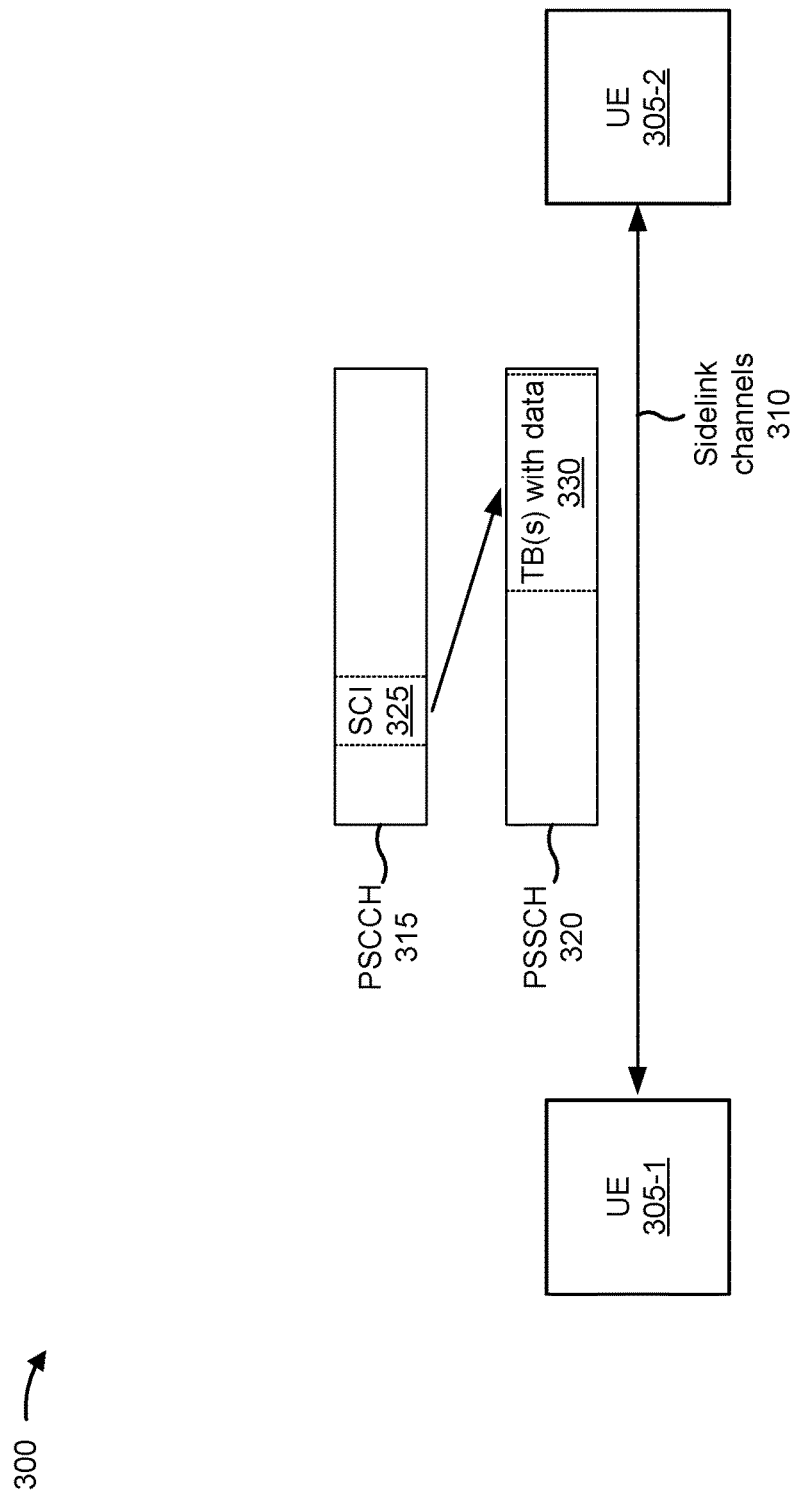
FIG. 3 is a block diagram illustrating an example of communications via a sidelink, in accordance with various aspects of the present disclosure.

FIG. 3 is a block diagram conceptually illustrating an example 300 of communications via a sidelink, in accordance with certain aspects of the present disclosure.

As shown in FIG. 3, a first UE 305-1 may communicate with a second UE 305-2 (and one or more other UEs 305) using device-to-device (D2D) communications via one or more sidelink channels 310. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit communications (e.g., one-to-many broadcasts and/or multicast transmissions) using the sidelink channel 310.

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time and/or frequency resources) where a transport block (TB) 330 that includes data is carried on the PSSCH 320. In some cases, the TB 330 may include vehicle-to-everything (V2X) data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like.

In some aspects, the sidelink channel 310 may use resource pools. For example, a scheduling assignment (e.g., included in SCI 325) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 (either UE 305-1 or UE 305-2) may operate using transmission mode 4, where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of communications based at least in part on the measurement(s).

Additionally, or alternatively, the UE 305 may perform resource selection and/or scheduling using SCI 325 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In transmission mode 4, a UE 305 may generate sidelink grants, and may transmit the grants in SCI 325. A sidelink grant may indicate, for example, one or more parameters (e.g., transmission parameters) to be used for an upcoming transmission, such as one or more resource blocks to be used for the upcoming transmission on the PSSCH 320 (e.g., for TBs 330), one or more subframes to be used for the upcoming transmission, a modulation and coding scheme (MCS) to be used for the upcoming transmission, and/or the like. In some aspects, a UE 305 may generate a sidelink grant that indicates one or more parameters for semi-persistent scheduling (SPS), such as a periodicity of a transmission (e.g., a periodic V2X message, such as a safety message and/or the like). Additionally, or alternatively, the UE 305 may generate a sidelink grant for event-driven scheduling, such as for an on-demand message.

In sidelink communications, conditions of the sidelink channel 310 used to carry the communications may vary widely and change quickly due to the high mobility of the UEs 305 (e.g., UEs associated with vehicles), large variations in UE activity at different times of day and in different locations, a wide variety of topographies that the UEs 305 may traverse (e.g., dense urban environments, hilly environments, flat environments, and/or the like), and/or the like. As a result, a transmit power used by a UE 305 in sidelink communications may need frequent adjustment in order to compensate for the varying conditions of the sidelink channel 310. However, current power control procedures (e.g., used in systems in which the UEs 305 may use a base station 110 as an intermediary to communicate) are performed infrequently, based at least in part on an assumption of a stationary transmitter (e.g., a stationary base station 110), and use time-averaged measurements of channel quality for determining transmit power. Accordingly, current power control procedures may result in unreliable sidelink communications. Some techniques and apparatuses described herein improve performance of sidelink communications using dynamic transmission property adjustment based at least in part on channel quality-based feedback signaled between the UEs 305.

As indicated above, FIG. 3 is provided merely as an example. Other examples may differ from what is described with regard to FIG. 3.

Figure 4:
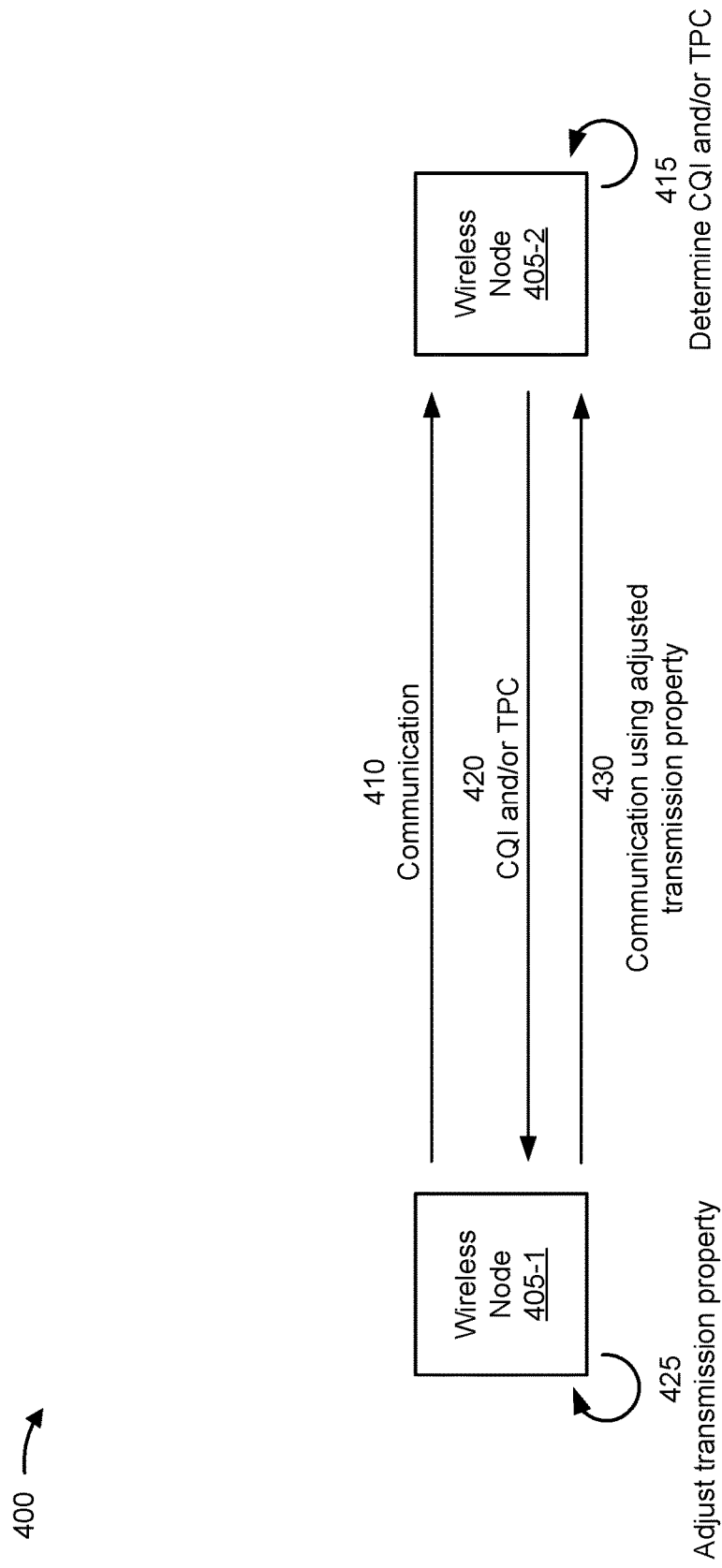
FIG. 4 is a diagram illustrating an example of transmission property adjustment in sidelink communications, in accordance with various aspects of the present disclosure.

FIG. 4 is a diagram illustrating an example 400 of transmission property adjustment in sidelink communications, in accordance with various aspects of the present disclosure. As shown in FIG. 4, a transmission-adjusting wireless node 405-1 may communicate with a feedback-reporting wireless node 405-2 (and one or more other wireless nodes 405) via one or more sidelink channels (e.g., sidelink channels 310). In some aspects, wireless node 405-1 and wireless node 405-2 both may be transmission-adjusting wireless nodes and feedback-reporting wireless nodes at the same time or at different times.

In some aspects, the wireless nodes 405 may correspond to one or more UEs described elsewhere herein (e.g., UE 120, UE 305, and/or the like) and/or integrated access backhaul (IAB) nodes. For example, the wireless nodes 405 both may be UEs or both may be IAB nodes. As another example, one wireless node 405 may be a UE and the other wireless node 405 may be an IAB node. In some aspects, a wireless node 405 may be associated with a vehicle (e.g., may be integrated into the vehicle, may be located in or on the vehicle, and/or the like). The vehicle may include an autonomous vehicle, a semi-autonomous vehicle, a non-autonomous vehicle, and/or the like. In some aspects, a wireless node 405 may be associated with infrastructure (e.g., traffic infrastructure), such as a traffic signal, a lane signal, a sensor, a traffic controller system, and/or the like.

As shown by reference number 410, the transmission-adjusting wireless node 405-1 may transmit a communication or transmission to the feedback-reporting wireless node 405-2 via a sidelink channel. For example, the communication or transmission may be a data communication transmitted from the transmission-adjusting wireless node 405-1 to the feedback-reporting wireless node 405-2 on a PSSCH 320. In some aspects, the transmission-adjusting wireless node 405-1 also may transmit a power headroom report (PHR) to the feedback-reporting wireless node 405-2 via the sidelink channel. In such a case, the transmission-adjusting wireless node 405-1 may transmit the PHR to the feedback-reporting wireless node 405-2 on a PSCCH 315. For example, the PHR may be included in SCI 325 transmitted from the transmission-adjusting wireless node 405-1 to the feedback-reporting wireless node 405-2.

The PHR may provide information relating to a power headroom of the transmission-adjusting wireless node 405-1. The power headroom may represent a difference of a maximum transmit power of the transmission-adjusting wireless node 405-1 and a transmit power used by the transmission-adjusting wireless node 405-1 for transmitting the communication. In some aspects, the maximum transmit power may be a maximum transmit power at which the transmission-adjusting wireless node 405-1 is capable of transmitting. Alternatively, the maximum transmit power may be a maximum transmit power at which the transmission-adjusting wireless node 405-1 is permitted to transmit. For example, the maximum transmit power may be a maximum transmit power at which the transmission-adjusting wireless node 405-1 can transmit without exceeding an interference threshold for an access link to a base station 110 serving the transmission-adjusting wireless node 405-1.

As shown by reference number 415, the feedback-reporting wireless node 405-2 may receive the communication from the transmission-adjusting wireless node 405-1 and determine, based at least in part on the communication, information relating to at least one of a channel quality of the sidelink channel or a power level for the transmission-adjusting wireless node 405-1. For example, the feedback-reporting wireless node 405-2 may determine an instantaneous channel quality or power level based at least in part on the communication. Accordingly, the information relating to the at least one of channel quality or power level may be transmission specific (e.g., specific to the communication or transmission from the transmission-adjusting wireless node 405-1).

In some aspects, the information relating to channel quality may be a CQI for the sidelink channel. For example, the feedback-reporting wireless node 405-2 may compute a CQI for the sidelink channel based at least in part on the communication or transmission received from the transmission-adjusting wireless node 405-1 (e.g., based at least in part on a signal-to-noise ratio of the communication, a signal-to-interference plus noise ratio of the communication, a signal-to-noise plus distortion ratio of the communication, and/or the like).

In some aspects, the information relating to power level may be a transmit power control (TPC) for the transmission-adjusting wireless node 405-1. For example, the feedback-reporting wireless node 405-2 may determine a TPC for the transmission-adjusting wireless node 405-1 based at least in part on the communication and/or based at least in part on the computed CQI. The TPC may provide an instruction to the transmission-adjusting wireless node 405-1 to increase transmit power or decrease transmit power. In some aspects, the TPC may indicate a particular transmit power that the transmission-adjusting wireless node 405-1 is to use, or may indicate a particular degree by which the transmission-adjusting wireless node 405-1 is to adjust transmit power. In some aspects, the TPC may be based at least in part on a PHR provided by the transmission-adjusting wireless node 405-1. For example, the feedback-reporting wireless node 405-2 may determine a TPC such that a transmit power adjustment that is to be used by the transmission-adjusting wireless node 405-1 does not exceed a power headroom of the transmission-adjusting wireless node 405-1 (e.g., a power headroom indicated by a PHR).

In some aspects, the feedback-reporting wireless node 405-2 may determine a transmission property that the transmission-adjusting wireless node 405-1 is to adjust based at least in part on the communication and the PHR provided by the transmission-adjusting wireless node 405-1. In such a case, if the CQI for the communication is below a threshold value (e.g., the communication has poor quality), the feedback-reporting wireless node 405-2 may determine the transmission property based at least in part on the PHR. For example, if a power headroom indicated by the PHR is below a threshold value (e.g., there is insufficient power headroom), the feedback-reporting wireless node 405-2 may determine that the transmission-adjusting wireless node 405-1 is to adjust an MCS (e.g., select an MCS that uses a lower data rate) used by the transmission-adjusting wireless node 405-1. In some aspects, the feedback-reporting wireless node 405-2 may select an MCS that the transmission-adjusting wireless node 405-1 is to use. As another example, if the power headroom is above the threshold value (e.g., there is sufficient power headroom), the feedback-reporting wireless node 405-2 may determine that the transmission-adjusting wireless node 405-1 is to adjust a transmit power (e.g., increase transmit power) used by the transmission-adjusting wireless node 405-1. In such a case, the feedback-reporting wireless node 405-2 may determine a TPC for the transmission-adjusting wireless node 405-1 to use when adjusting the transmit power, as described above. In addition, if the power headroom is above the threshold value, the feedback-reporting wireless node 405-2 may additionally, or alternatively, determine that the transmission-adjusting wireless node 405-1 is to adjust an MCS, as described above.

The feedback-reporting wireless node 405-2 may provide the information relating to a computed CQI, a determined TPC, and/or a determined transmission property for adjustment to the transmission-adjusting wireless node 405-1. In some aspects, the feedback-reporting wireless node 405-2 may provide the information in acknowledgment or negative-acknowledgment feedback of the communication from the transmission-adjusting wireless node 405-1. In some aspects, the information may include a timestamp or another indication that associates the information with the communication from the transmission-adjusting wireless node 405-1. In this way, the timestamp or the other indication enables the transmission-adjusting wireless node 405-1 to determine a particular communication of the transmission-adjusting wireless node 405-1 that is associated with the information.

As shown by reference number 420, the transmission-adjusting wireless node 405-1 may receive (e.g., in acknowledgment or negative-acknowledgment feedback from the feedback-reporting wireless node 405-2) the information relating to the computed CQI, the determined TPC, and/or the determined transmission property for adjustment. As noted above, the information may be specific to a particular communication of the transmission-adjusting wireless node 405-1 (i.e., transmission-specific, in the illustrated example, communication 410). Accordingly, before using the information, the transmission-adjusting wireless node 405-1 may determine whether the information is associated with a recent transmission of the transmission-adjusting wireless node 405-1 (e.g., a most recent transmission or a transmission that occurred within a threshold time period).

In some aspects, the communication of the transmission-adjusting wireless node 405-1 may be received by a plurality of wireless nodes 405 (e.g., the communication may be a broadcast), and the transmission-adjusting wireless node 405-1 may receive, from each of the plurality of wireless nodes 405, information relating to a channel quality of a sidelink channel and/or a transmit power for the transmission-adjusting wireless node 405-1. For example, the transmission-adjusting wireless node 405-1 may receive a plurality of information (e.g., transmission-specific information) relating to a channel quality (e.g., CQI) of a sidelink channel. As another example, the transmission-adjusting wireless node 405-1 may receive a plurality of information (e.g., transmission-specific information) relating to a power level for the transmission-adjusting wireless node 405-1.

As shown by reference number 425, the transmission-adjusting wireless node 405-1 may adjust a transmission property of the transmission-adjusting wireless node 405-1 (e.g., a transmission property that is to be used for transmissions to the feedback-reporting wireless node 405-2 via the sidelink channel) based at least in part on the received information relating to channel quality and/or transmit power. In some aspects, the transmission-adjusting wireless node 405-1 may adjust a transmission property for subsequent communications or transmissions from the transmission-adjusting wireless node 405-1 to the feedback-reporting wireless node 405-2 based at least in part on transmission-specific information determined by the feedback-reporting wireless node 405-2. In other words, each acknowledgment or negative-acknowledgment feedback provided by the feedback-reporting wireless node 405-2 may enable the transmission-adjusting wireless node 405-1 to adjust a transmission property that is to be used for the following communication from the transmission-adjusting wireless node 405-1 to the feedback-reporting wireless node 405-2. For example, after receiving acknowledgment or negative-acknowledgment feedback from the feedback-reporting wireless node 405-2 that includes transmission-specific information relating to channel quality and/or transmit power, the transmission-adjusting wireless node 405-1 may adjust a transmission property for a next communication to the feedback-reporting wireless node 405-2 based at least in part on the transmission-specific information. In this way, the adjusted transmission property, that is to be used by the transmission-adjusting wireless node 405-1 for a communication to the feedback-reporting wireless node 405-2, is also transmission-specific.

In some aspects, the transmission-adjusting wireless node 405-1 may adjust a transmission property based at least in part on a plurality of received information (e.g., transmission-specific information) relating to channel quality and/or transmit power (e.g., received from a plurality of wireless nodes 405). In such a case, the transmission-adjusting wireless node 405-1 may adjust the transmission property based at least in part on a lowest channel quality, a highest channel quality, a most recurrent channel quality (e.g., a modal channel quality representing a most common value for the channel quality over a given number of samples), a lowest power level, a highest power level, a most recurrent power level (e.g., a modal power level), and/or the like, indicated in the plurality of received information.

The transmission property adjusted by the transmission-adjusting wireless node 405-1 may be a transmit power and/or an MCS of the transmission-adjusting wireless node 405-1. In some aspects, the transmission-adjusting wireless node 405-1 may determine to adjust transmit power and/or an MCS based at least in part on whether the information relating to channel quality (e.g., CQI) satisfies a threshold value. For example, if the determined CQI is below a threshold value (e.g., the channel quality is unsatisfactory), the transmission-adjusting wireless node 405-1 may increase transmit power and/or select an MCS that uses a lower data rate. As another example, if the determined CQI is above the threshold value (e.g., the channel quality is satisfactory), the transmission-adjusting wireless node 405-1 may decrease a transmit power and/or select an MCS that uses a higher data rate. In such cases, the transmission-adjusting wireless node 405-1 may determine a degree by which to adjust transmit power and/or an MCS based at least in part on a degree by which the CQI is above or below the threshold value.

In some aspects, when the CQI is below the threshold value, the transmission-adjusting wireless node 405-1 may determine to adjust transmit power (e.g., increase transmit power) and/or an MCS (e.g., select an MCS that uses a lower data rate) based at least in part on whether the transmission-adjusting wireless node 405-1 is being served by a base station 110. For example, the transmission-adjusting wireless node 405-1 may determine to adjust an MCS (e.g., select an MCS that uses a lower data rate) based at least in part on a determination that adjusting a transmit power of the transmission-adjusting wireless node 405-1 would cause the transmission-adjusting wireless node 405-1 to exceed an interference threshold for an access link to a base station 110. As another example, the transmission-adjusting wireless node 405-1 may determine to adjust transmit power (e.g., increase transmit power) based at least in part on a determination that the transmission-adjusting wireless node 405-1 is out of coverage of a base station 110. In such a case, the transmission-adjusting wireless node 405-1 may determine to adjust transmit power according to a TPC determined by the feedback-reporting wireless node 405-2. Moreover, when the transmission-adjusting wireless node 405-1 is out of coverage of a base station 110, the transmission-adjusting wireless node 405-1 may additionally, or alternatively, adjust an MCS (e.g., select an MCS that uses a lower data rate).

In some aspects, the transmission-adjusting wireless node 405-1 may determine to adjust transmit power and/or an MCS based at least in part on information relating to a determined transmission property for adjustment (e.g., determined by the feedback-reporting wireless node 405-2, as described above). For example, if the information indicates that the transmission-adjusting wireless node 405-1 is to adjust an MCS, the transmission-adjusting wireless node 405-1 may adjust an MCS that is to be used for transmissions to the feedback-reporting wireless node 405-2. In some aspects, the transmission-adjusting wireless node 405-1 may select an MCS that is specified in the information. As another example, if the information indicates that the transmission-adjusting wireless node 405-1 is to adjust transmit power, the transmission-adjusting wireless node 405-1 may adjust a transmit power that is to be used for transmissions to the feedback-reporting wireless node 405-2. In some aspects, the transmission-adjusting wireless node 405-1 may adjust transmit power according to a TPC specified in the information.

As shown by reference number 430, the transmission-adjusting wireless node 405-1 may transmit a communication to the feedback-reporting wireless node 405-2, via the sidelink channel, using the adjusted transmission property (e.g., transmit power and/or MCS). For example, the transmission-adjusting wireless node 405-1 may transmit the communication to the feedback-reporting wireless node 405-2 using a transmission-specific adjusted transmission property. In such a case, the transmission-specific adjusted transmission property used for the communication may be based at least in part on a previous communication that immediately preceded the communication. In this way, transmissions from the transmission-adjusting wireless node 405-1 to the feedback-reporting wireless node 405-2 account for an instantaneous channel quality between the wireless nodes 405.

As indicated above, FIG. 4 is provided as an example. Other examples may differ from what is described with respect to FIG. 4.

Figure 5:
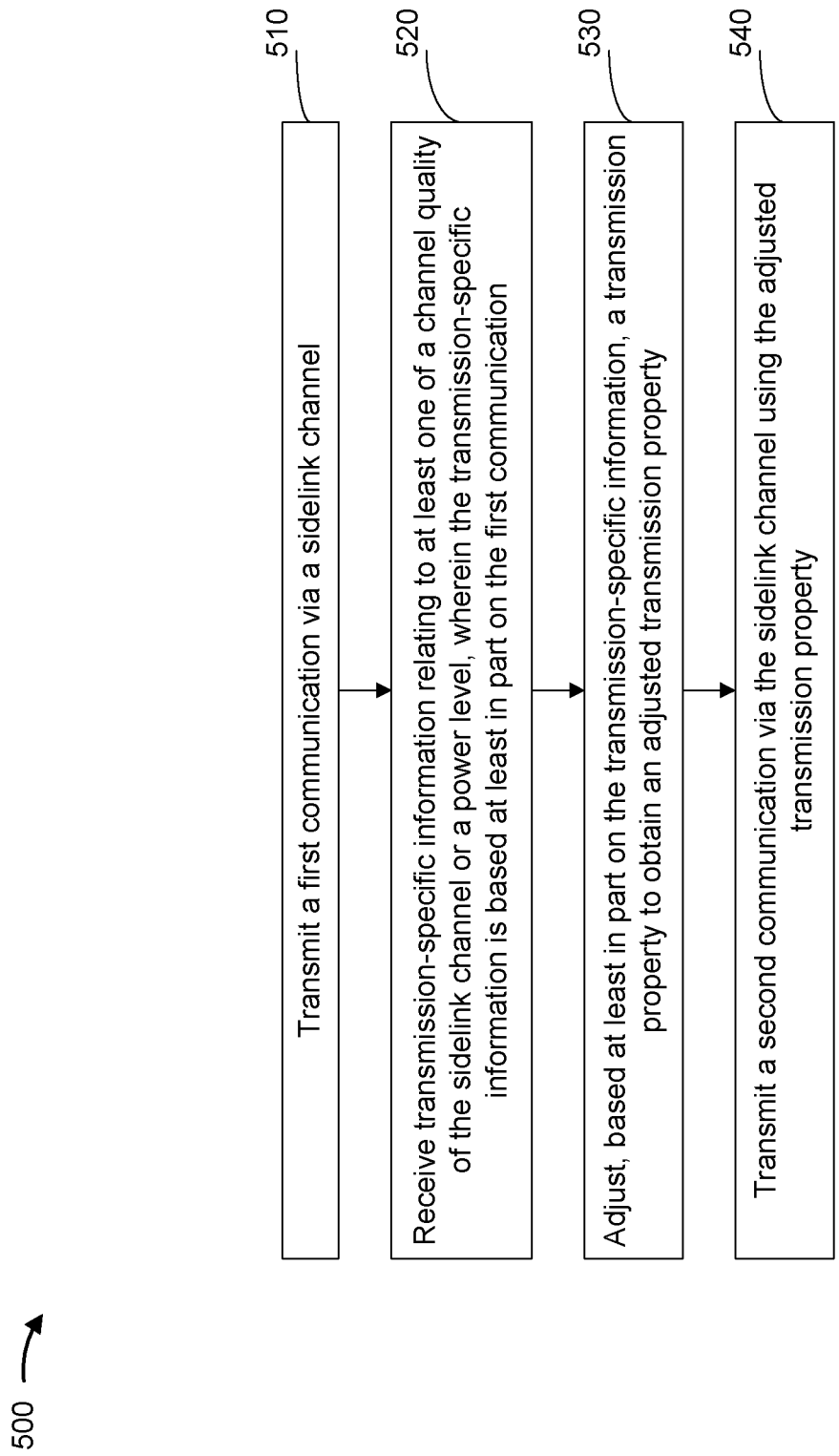
FIG. 5 is a diagram illustrating an example process performed, for example, by a wireless node, in accordance with various aspects of the present disclosure.

FIG. 5 is a diagram illustrating an example process 500 performed, for example, by a wireless node, in accordance with various aspects of the present disclosure. Example process 500 is an example where a wireless node (e.g., wireless node 405, and/or the like) performs operations associated with transmission property adjustment in sidelink communications.

As shown in FIG. 5, in some aspects, process 500 may include transmitting a first communication via a sidelink channel (block 510). For example, the wireless node (e.g., using transmit processor 264, controller/processor 280, memory 282, and/or the like) may transmit a first communication via a sidelink channel, as described above, for example, with reference to FIG. 4.

As further shown in FIG. 5, in some aspects, process 500 may include receiving transmission-specific information relating to at least one of a channel quality of the sidelink channel or a power level, wherein the transmission-specific information is based at least in part on the first communication (block 520). For example, the wireless node (e.g., using receive processor 258, controller/processor 280, memory 282, and/or the like) may receive transmission-specific information relating to at least one of a channel quality of the sidelink channel or a power level for the transmission-adjusting wireless node, as described above, for example, with reference to FIG. 4. In some aspects, the transmission-specific information is based at least in part on the first communication.

As further shown in FIG. 5, in some aspects, process 500 may include adjusting, based at least in part on the transmission-specific information, a transmission property to obtain an adjusted transmission property (block 530). For example, the wireless node (e.g., using controller/processor 280, memory 282, and/or the like) may adjust, based at least in part on the transmission-specific information, a transmission property to obtain an adjusted transmission property, as described above.

As further shown in FIG. 5, in some aspects, process 500 may include transmitting a second communication via the sidelink channel using the adjusted transmission property (block 540). For example, the wireless node (e.g., using transmit processor 264, controller/processor 280, memory 282, and/or the like) may transmit a second communication via the sidelink channel using the adjusted transmission property, as described above.

Process 500 may include additional aspects, such as any single aspect or any combination of aspects described below and/or in connection with one or more other processes described elsewhere herein.

In a first aspect, the transmission-specific information relates to at least one of a channel quality indicator of the sidelink channel or a transmit power control. In a second aspect, alone or in combination with the first aspect, the transmission-specific information is received with acknowledgment or negative-acknowledgment feedback of the first communication. In a third aspect, alone or in combination with one or more of the first and second aspects, the adjusted transmission property is at least one of a modulation and coding scheme or a transmit power.

In a fourth aspect, alone or in combination with one or more of the first through third aspects, the adjusted transmission property is a modulation and coding scheme of a transmission-adjusting wireless node, based at least in part on a determination that adjusting a transmit power of the transmission-adjusting wireless node would cause the transmission-adjusting wireless node to exceed an interference threshold for an access link to a base station serving the transmission-adjusting wireless node. In a fifth aspect, alone or in combination with one or more of the first through third aspects, the adjusted transmission property is a transmit power of a transmission-adjusting wireless node, based at least in part on a determination that the transmission-adjusting wireless node is out of coverage of a base station.

In a sixth aspect, alone or in combination with one or more of the first through fifth aspects, a plurality of transmission-specific information relating to channel quality is received from a plurality of feedback-reporting wireless nodes, and the adjusted transmission property is based at least in part on a lowest channel quality indicated in the plurality of transmission-specific information. In a seventh aspect, alone or in combination with one or more of the first through fifth aspects, a plurality of transmission-specific information relating to channel quality is received from a plurality of feedback-reporting wireless nodes, and the adjusted transmission property is based at least in part on a most recurrent channel quality indicated in the plurality of transmission-specific information.

In an eighth aspect, alone or in combination with one or more of the first through seventh aspects, the transmission-specific information is based at least in part on the first communication and the PHR. In a ninth aspect, alone or in combination with one or more of the first through eighth aspects, the transmission-specific information indicates that a modulation and coding scheme is to be adjusted. In a tenth aspect, alone or in combination with one or more of the first through ninth aspects, the transmission-specific information indicates that a transmit power of the transmission-adjusting wireless node is to be adjusted.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmission-adjusting wireless node, comprising:
    transmitting a first communication via a sidelink channel;
    receiving, from a feedback-reporting wireless node, transmission-specific information relating to a channel quality indicator of the sidelink channel based at least in part on at least one of a signal-to-noise ratio of the first communication, a signal-to-interference plus noise ratio of the first communication, or a signal-to-noise plus distortion ratio of the first communication,
        wherein the transmission-specific information is based at least in part on the first communication;
    adjusting, based at least in part on the transmission-specific information, a transmission property of the transmission-adjusting wireless node to obtain an adjusted transmission property,
        wherein the adjusted transmission property is a modulation and coding scheme and a transmit power of the transmission-adjusting wireless node; and
    transmitting a second communication via the sidelink channel using the adjusted transmission property.

2. The method of claim 1, wherein the transmission-specific information further relates to a transmit power control for the transmission-adjusting wireless node.

3. The method of claim 1, wherein the transmission-specific information is received with acknowledgment or negative-acknowledgment feedback of the first communication from the feedback-reporting wireless node.

4. The method of claim 1, wherein the adjusted transmission property is based at least in part on a determination that adjusting the transmit power of the transmission-adjusting wireless node would cause the transmission-adjusting wireless node to exceed an interference threshold for an access link to a network node serving the transmission-adjusting wireless node.

5. The method of claim 1, wherein the adjusted transmission property is based at least in part on a determination that the transmission-adjusting wireless node is out of coverage of a network node.

6. The method of claim 1, wherein a plurality of transmission-specific information relating to channel quality is received from a plurality of feedback-reporting wireless nodes, and
    wherein the adjusted transmission property is based at least in part on a lowest channel quality indicated in the plurality of transmission-specific information.

7. The method of claim 1, wherein a plurality of transmission-specific information relating to channel quality is received from a plurality of feedback-reporting wireless nodes, and
    wherein the adjusted transmission property is based at least in part on a most recurrent channel quality indicated in the plurality of transmission-specific information.

8. The method of claim 1, further comprising:
    transmitting a power headroom report (PHR) to the feedback-reporting wireless node,
        wherein the transmission-specific information is based at least in part on the first communication and the PHR.

9. The method of claim 8, wherein the transmission-specific information indicates that the modulation and coding scheme of the transmission-adjusting wireless node is to be adjusted.

10. The method of claim 8, wherein the transmission-specific information indicates that the transmit power of the transmission-adjusting wireless node is to be adjusted.

11. A transmission-adjusting wireless node for wireless communication, comprising:
    a memory; and
    one or more processors coupled to the memory, the one or more processors configured to:
        transmit a first communication via a sidelink channel;
        receive, from a feedback-reporting wireless node, transmission-specific information relating to a channel quality indicator of the sidelink channel based at least in part on at least one of a signal-to-noise ratio of the first communication, a signal-to-interference plus noise ratio of the first communication, or a signal-to-noise plus distortion ratio of the first communication,
            wherein the transmission-specific information is based at least in part on the first communication;
        adjust, based at least in part on the transmission-specific information, a transmission property of the transmission-adjusting wireless node to obtain an adjusted transmission property,
            wherein the adjusted transmission property is a modulation and coding scheme and a transmit power of the transmission-adjusting wireless node; and
        transmit a second communication via the sidelink channel using the adjusted transmission property.

12. The transmission-adjusting wireless node of claim 11, wherein the transmission-specific information further relates to a transmit power control for the transmission-adjusting wireless node.

13. The transmission-adjusting wireless node of claim 11, wherein the transmission-specific information is received with acknowledgment or negative-acknowledgment feedback of the first communication from the feedback-reporting wireless node.

14. The transmission-adjusting wireless node of claim 11, wherein the adjusted transmission property is based at least in part on a determination that adjusting the transmit power of the transmission-adjusting wireless node would cause the transmission-adjusting wireless node to exceed an interference threshold for an access link to a network node serving the transmission-adjusting wireless node.

15. The transmission-adjusting wireless node of claim 11, wherein the adjusted transmission property is based at least in part on a determination that the transmission-adjusting wireless node is out of coverage of a network node.

16. The transmission-adjusting wireless node of claim 11, wherein a plurality of transmission-specific information relating to channel quality is received from a plurality of feedback-reporting wireless nodes, and
    wherein the adjusted transmission property is based at least in part on a lowest channel quality indicated in the plurality of transmission-specific information.

17. The transmission-adjusting wireless node of claim 11, wherein a plurality of transmission-specific information relating to channel quality is received from a plurality of feedback-reporting wireless nodes, and
    wherein the adjusted transmission property is based at least in part on a most recurrent channel quality indicated in the plurality of transmission-specific information.

18. The transmission-adjusting wireless node of claim 11, wherein the one or more processors are further configured to:
    transmit a power headroom report (PHR) to the feedback-reporting wireless node,
        wherein the transmission-specific information is based at least in part on the first communication and the PHR.

19. The transmission-adjusting wireless node of claim 18, wherein the transmission-specific information indicates that the modulation and coding scheme of the transmission-adjusting wireless node is to be adjusted.

20. The transmission-adjusting wireless node of claim 18, wherein the transmission-specific information indicates that the transmit power of the transmission-adjusting wireless node is to be adjusted.

21. A non-transitory computer-readable medium storing one or more instructions for wireless communication, the one or more instructions comprising:
    one or more instructions that, when executed by one or more processors of a transmission-adjusting wireless node, cause the one or more processors to:
        transmit a first communication via a sidelink channel;
        receive, from a feedback-reporting wireless node, transmission-specific information relating to a channel quality indicator of the sidelink channel based at least in part on at least one of a signal-to-noise ratio of the first communication, a signal-to-interference plus noise ratio of the first communication, or a signal-to-noise plus distortion ratio of the first communication,
            wherein the transmission-specific information is based at least in part on the first communication;
        adjust, based at least in part on the transmission-specific information, a transmission property of the transmission-adjusting wireless node to obtain an adjusted transmission property,
            wherein the adjusted transmission property is a modulation and coding scheme and a transmit power of the transmission-adjusting wireless node; and
        transmit a second communication via the sidelink channel using the adjusted transmission property.

22. The non-transitory computer-readable medium of claim 21, wherein the transmission-specific information further relates to a transmit power control for the transmission-adjusting wireless node.

23. The non-transitory computer-readable medium of claim 21, wherein the transmission-specific information is received with acknowledgment or negative-acknowledgment feedback of the first communication from the feedback-reporting wireless node.

24. An apparatus for wireless communication, comprising:
    means for transmitting a first communication via a sidelink channel;
    means for receiving, from a feedback-reporting wireless node, transmission-specific information relating to a channel quality indicator of the sidelink channel based at least in part on at least one of a signal-to-noise ratio of the first communication, a signal-to-interference plus noise ratio of the first communication, or a signal-to-noise plus distortion ratio of the first communication,
        wherein the transmission-specific information is based at least in part on the first communication;
    means for adjusting, based at least in part on the transmission-specific information, a transmission property of the apparatus to obtain an adjusted transmission property,
    wherein the adjusted transmission property is a modulation and coding scheme and a transmit power of the apparatus; and
    means for transmitting a second communication via the sidelink channel using the adjusted transmission property.

25. The apparatus of claim 24, wherein the transmission-specific information further relates to a transmit power control for the apparatus.

26. The apparatus of claim 24, wherein the transmission-specific information is received with acknowledgment or negative-acknowledgment feedback of the first communication from the feedback-reporting wireless node.

27. The non-transitory computer-readable medium of claim 21, wherein the adjusted transmission property is based at least in part on a determination that adjusting the transmit power of the transmission-adjusting wireless node would cause the transmission-adjusting wireless node to exceed an interference threshold for an access link to a network node serving the transmission-adjusting wireless node.

28. The non-transitory computer-readable medium of claim 21, wherein the adjusted transmission property is based at least in part on a determination that the transmission-adjusting wireless node is out of coverage of a network node.

29. The apparatus of claim 24, wherein the adjusted transmission property is based at least in part on a determination that adjusting the transmit power of the apparatus would cause the apparatus to exceed an interference threshold for an access link to a network node serving the apparatus.

30. The apparatus of claim 24, wherein the adjusted transmission property is based at least in part on a determination that the apparatus is out of coverage of a network node.

\* \* \* \* \*